United States Patent [19]

Peters et al.

[11] Patent Number: 4,681,360
[45] Date of Patent: Jul. 21, 1987

[54] COMBINATION ACCESS BOX AND BED LINER FOR VEHICLES

[76] Inventors: Richard E. Peters; Larry J. Parlette, both of 3345 SE. 22nd Ave., Portland, Oreg. 97202

[21] Appl. No.: 930,061

[22] Filed: Nov. 12, 1986

Related U.S. Application Data

[63] Continuation of Ser. No. 788,473, Oct. 17, 1985, abandoned.

[51] Int. Cl.$^4$ .............................................. B60R 5/04
[52] U.S. Cl. ............................... 296/37.6; 414/522
[58] Field of Search .................. 296/26, 35.3, 57 A, 296/62, 37.6; 224/42.43, 42.44; 414/522; 312/215; 292/DIG. 46, DIG. 47, 175

[56] References Cited

U.S. PATENT DOCUMENTS

| | | | |
|---|---|---|---|
| 2,576,385 | 11/1951 | Bigsby | 224/42.44 |
| 2,784,027 | 3/1957 | Temp | 296/156 |
| 2,852,303 | 9/1958 | Hopson | 296/50 |
| 3,224,805 | 12/1965 | Clyatt | 296/29 |
| 3,381,835 | 5/1968 | Lee | 414/462 |
| 3,471,045 | 10/1969 | Panciocco | 414/522 |
| 3,700,301 | 10/1972 | Boeck | 312/215 |
| 4,305,695 | 12/1981 | Zachrich | 414/522 |
| 4,375,306 | 3/1983 | Linder | 312/250 |

*Primary Examiner*—Robert B. Reeves
*Assistant Examiner*—Carol L. Olson

[57] ABSTRACT

A pair of support members are arranged for mounting on the floor of a vehicle cargo area and support a cargo box by rollers for movement between forward and rearward positions to provide easy access for loading and unloading the box at the rear of the cargo area. The support members and box have engaging latch portions providing latching stops for the box in forward, rearward and intermediate positions. The rearward end of the box is open and is arranged to be closed by the rear door of the vehicle cargo area. Roller support of the box is such that it has a cantilevered support in its rearwardmost position which is horizontal and in alignment with its line of travel. The box has reinforcement therearound so as to hold cargo and also serves as a liner to protect the cargo area.

3 Claims, 8 Drawing Figures

COMBINATION ACCESS BOX AND BED LINER FOR VEHICLES

This application is a continuation, of application Ser. No. 788,473, filed 10/17/85, now abandoned.

BACKGROUND OF THE INVENTION

Most cargo vehicles such as pickups, vans, and the like have permanent or removable covers over the cargo area for protecting the cargo. Since this type of covered vehicle only has a rear opening, it is inconvenient to reach articles at the front of the cargo area. It is usually necessary to climb into the rear opening and work the articles rearward or to risk injury by leaning inward and picking up or pulling the articles rearward. The same applies in reverse, namely, when loading the vehicle.

Various devices have been utilized in vehicles for increasing the load carrying area some of which are capable of being pulled rearwardly for increasing the length of the said area or for moving compartmented portions of the device into a rearward accessible position. Such devices are shown in Pat. Nos. 2,576,385, 2,784,027, 2,852,303, 4,305,695 and 4,375,306. A utility box which is rearwardly movable from the vehicle also has been provided for carrying equipment, sand, etc. as shown in Pat. No. 3,381,835.

SUMMARY OF THE INVENTION

A primary objective of the present invention is to provide a new concept in load carrying boxes for vehicle cargo areas, namely, to provide an access box having a novel combination of structure capable of positioning the box rearward in a straight line horizontal and self-supported position and arranged such that articles in the front of the box are made accessible at the rear of the vehicle cargo area so that such articles can be picked up through the rear opening of the vehicle cargo area.

More particular objectives of the invention are to provide an access box for vehicles that includes sturdy track means suspending the box from the floor of the vehicle and fully supporting said box in its rearwardmost horizontal position without ground support; to provide an access box for vehicles that has an open, reinforced, unobstructed rearward end which provides convenience in reaching or removing articles in the box through the rear opening of the vehicle; to provide an access box with an open rearward end which is combined with the usual closure door on the vehicle which when shut serves to close the open rearward end of the box; and to provide an access box of the type described having a plurality of outwardly extended positions, together with conveniently operable latch means therefor and means for entirely removing the box.

Another object is to provide an access box of the type described which also serves as a bed liner to protect the interior of the vehicle cargo area.

In carrying out these objectives, an access box is provided which is mass or custom designed for use in pickups, vans, station wagons, etc. It employs a container having a sturdy rib reinforced bottom wall, side walls, and a front wall. The rearward end of the box is open and such rearward end is combined with the closure door of the cargo area of the vehicle so that said closure door also closes the rearward end of the access box. Roller assemblies are provided for side support of the box on the vehicle floor, the box being supported off the floor of the vehicle for easy movement. The roller support is such that the box is firmly held up in a horizontal rearward position in alignment with its line of travel without ground support, and in such rearward position articles at the front of the box can be reached by access through the rear opening of the vehicle cargo area. The roller assembly has a front latched position, a rear latched safety position and stop and intermediate latched positions for positioning the box in various outward positions. Also, the box can be fully removed without the use of tools. The box is readily movable manually but also can be combined with power means to drive it in and out and can be provided in multiple layers. The box serves as a bed liner for protecting the cargo area of the vehicle.

The invention will be better understood and additional objects and advantages will become apparent from the following description taken in connection with the accompanying drawings.

DETAILED DESCRIPTION OF PREFERRED EMBODIMENTS

Figure 1:
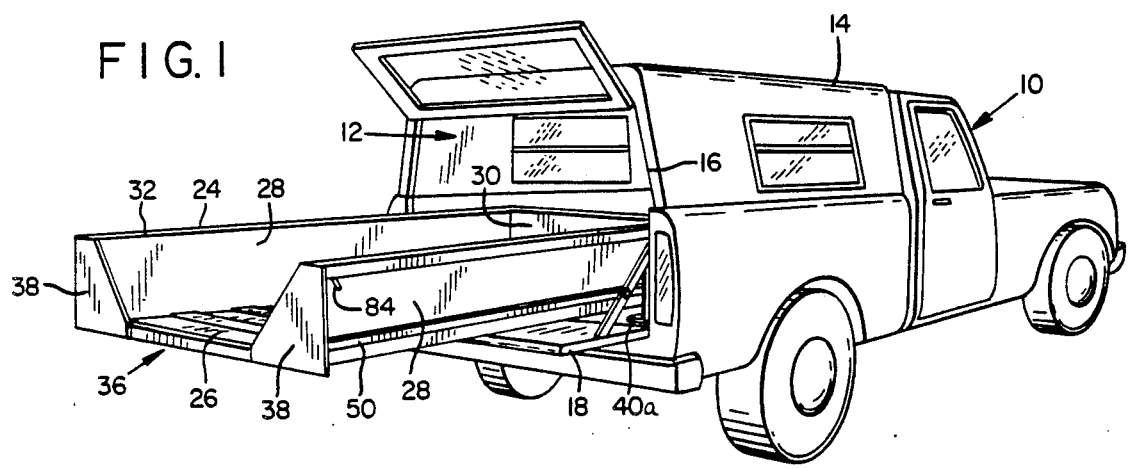
FIG. 1 is a perspective view of the present combination access box and bed liner as installed in a vehicle, the box being shown in a rearward access position.

With reference to FIG. 1, a vehicle 10 is illustrated of the type with which the present combination access box and bed liner is applicable. The vehicle shown comprises a pickup truck with which the present invention is particularly useful, although it is to be understood that the invention can as well be used with vans, station wagons, etc. The invention is employed primarily in those instances where the cargo area 12 is covered such as by a canopy 14 on a pickup truck. The numeral 16 represents the rear opening of the cargo area and the numeral 18 represents the conventional tailgate. The numeral 20 in FIG. 3 represents the floor of the cargo area on which the present invention is supported, as will now be described.

With particular reference to FIGS. 1–4, the combination access box and bed liner is designated by the numeral 24 and comprises a bottom wall 26 which is ribbed for strength, side walls 28 and a front wall 30.

The top of the side walls has a flanged and angled horizontal extension 32 for longitudinal reinforcement and for concealing latch mechanism to be described. Front wall 30 also has a reinforcing flange 34 on the top thereof and suitable reinforcing recesses 35 in intermediate areas thereof. As designated by the numeral 36, the rearward end of the box is open and comprises an unobstructed opening except for triangular reinforcing webs 38 at the sides. Such webs provide rigidity to the rearward end of the box and yet allow such rearward end to be open for easy access from the rear.

Figure 2:
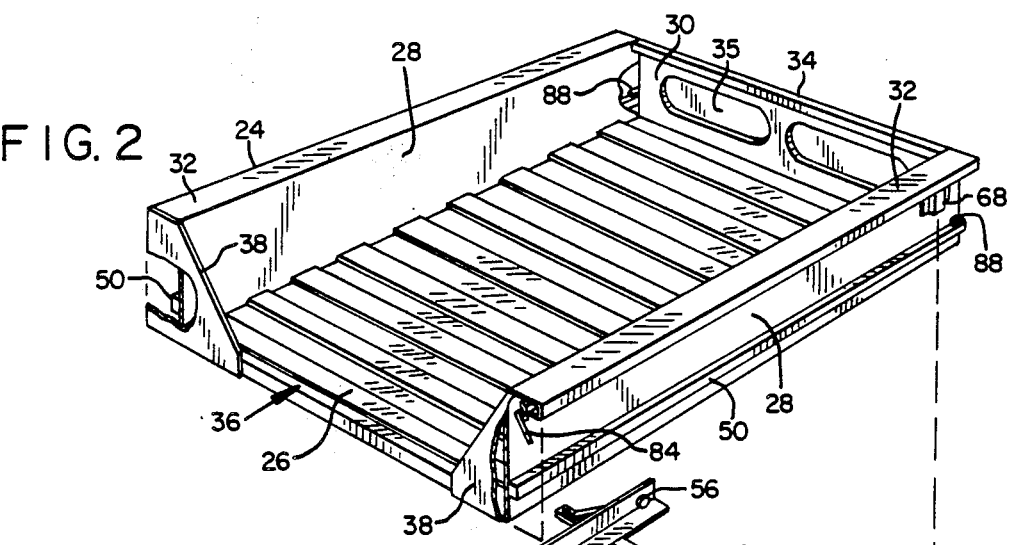
FIG. 2 is an exploded view of the box and support means therefor apart from the vehicle.
Figure 3:
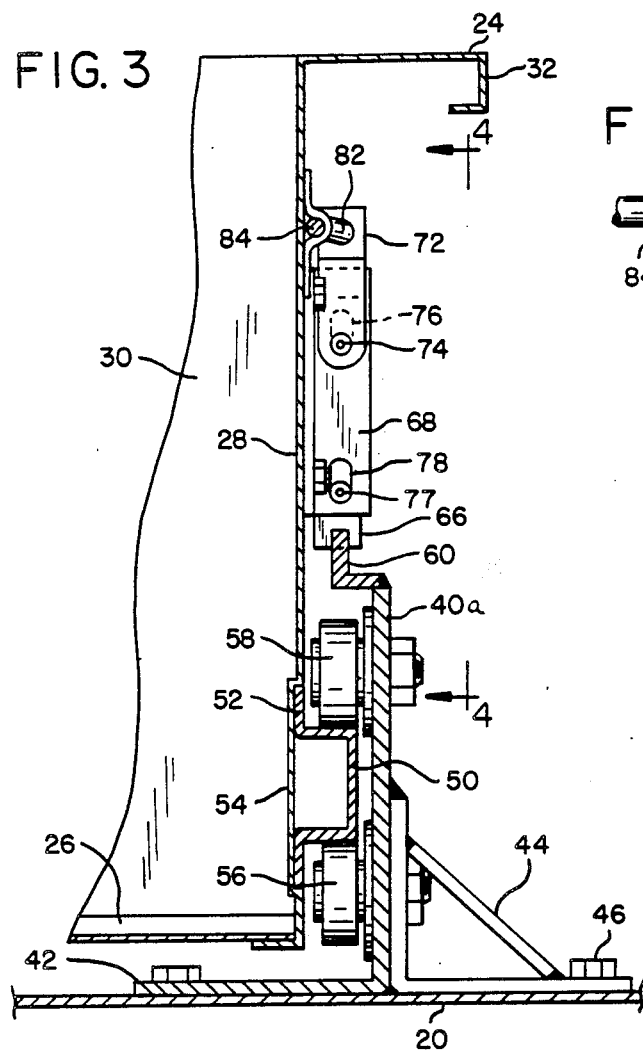
FIG. 3 is a fragmentary sectional view taken on the line 3—3 of FIG. 2 showing the box and support means as assembled, the form shown in this view comprising a first embodiment of support for the box and also showing latch means.
Figure 4:
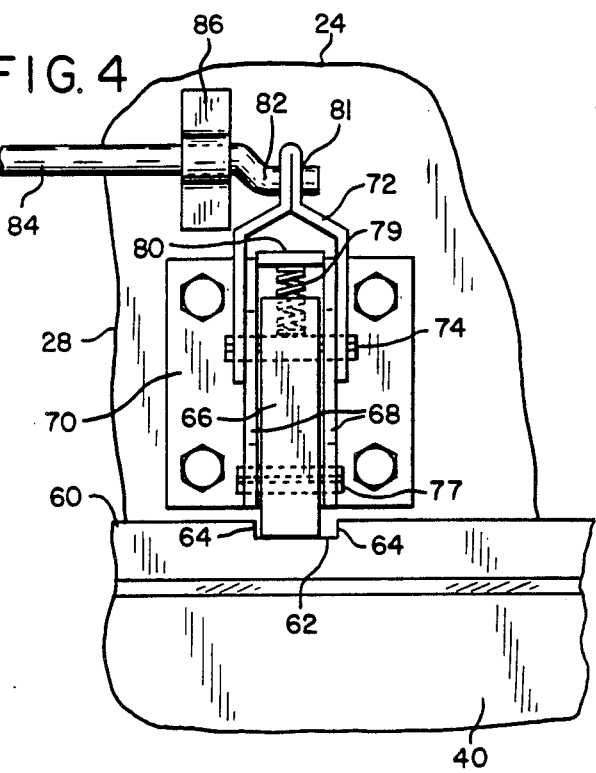
FIG. 4 is a fragmentary elevational view taken on the line 4—4 of FIG. 3 and showing details of the latch means.

With reference to FIGS. 2 and 3, a support frame for the box on the cargo area floor comprises left and right longitudinal support members 40 and 40a, respectively, such as angle irons, secured integrally and rigidly together by cross straps 42. Bracing struts 44 are secured at the sides in a suitable manner to the longitudinal support members 40 and 40a. The straps 42 and the bracing struts 44 are suitably secured to the floor of the vehicle, such as by bolts 46. While it is preferred that the support means 40 and 40a be bolted to the floor of the vehicle so that the access box assembly can be taken out if desired, such support means can be permanently mounted, as by welding, if it is to be a permanent part of the vehicle.

Secured on each of the side walls 28 of the box at a lower portion thereof is a longitudinal rail 50 preferably comprising a U-shaped stamped piece with outturned flanges 52 fitted in a longitudinal recess 54 in the side wall. These flanged portions are preferably welded in place.

Rails 50 have rolling support on a plurality of rollers 56 which are engaged by the bottom of the rail 50 and an upper roller 58 on each side engageable with the top of the rail. Roller 58 on the left-hand side is mounted on an extension 59 of the support member 40 and the roller 58 on the right-hand side is mounted on an upper portion of the support member 40a, the over-all height of the latter member being greater than the over-all height of the support member 40 to provide horizontal alignment of the two rollers 58. Rollers 58 and the rearwardmost rollers 56 provide a cantilevered support of the box in its rearward position, and as will be more fully described, the box is movable into a rearward access position by the support means in horizontal travel and in straight line alignment with its line of travel.

Latch means are provided between the box and its support, and for this purpose, the longitudinal support member 40a has a vertical extension 60 with a plurality of notches 62 in its top edge. These notches, FIG. 4, preferably are defined by vertical or square edges 64 and are engageable by a detent 66 supported on the box for manually operable vertical movement. More particularly, the detent 66 has guided movement between a pair of outwardly directed flanges 68 of a channel bracket 70 suitably secured to a side wall of the box 24. The detent 66 is connected to an upright yoke 72 by a cross pin 74 slidably confined in slots 76 in the flanges 68. The detent is also guided at its lower end by a cross pin 77 secured thereto and confined for vertical movement in slots 78 in the channel bracket. The detent has spring pressed downward movement by a compression spring 79 engaged between the detent and a projection 80 on the bracket 70 whereby the detent will positively engage the notches when moving along the top edge of the latch extension 60 with the box. The notches have a clearance width relative to the width of the detent to insure that the detent will engage therein as it travels on the top edge of extension 60. The square edges of the notches insure a locked engagement of the box in both directions so that the box will be safely locked in all positions even though the vehicle is on an inclined surface.

The upper end of the yoke 72 has a pivotal connection 81 with a crank portion 82 of a latch rod 84 extending to the rearward end of the box and pivotally supported in brackets 86 on the box. Notches 62 are selectively located such that the box is latched in its forwardmost position and also in its rearwardmost position, and with the spring pressed operation of the detent, the box cannot bypass any one of the notches, including the rearwardmost notch unless the latch rod is held in released position. Thus, the box cannot accidentally move rearward of its rearwardmost latched position. In addition, the forward end of one or both of the rails 50 at the top edge thereof has a stop block 88, FIG. 2, which is engageable with the front roller 58 rearward of the rearwardmost latched position of the box whereby the box cannot accidentally roll out of its support. For taking out the box it is moved to this abutting position of the blocks against rollers 58 and then tilted up from the rear to clear the blocks 88 from rollers 58 whereby the box can be displaced from its support.

Figure 5:
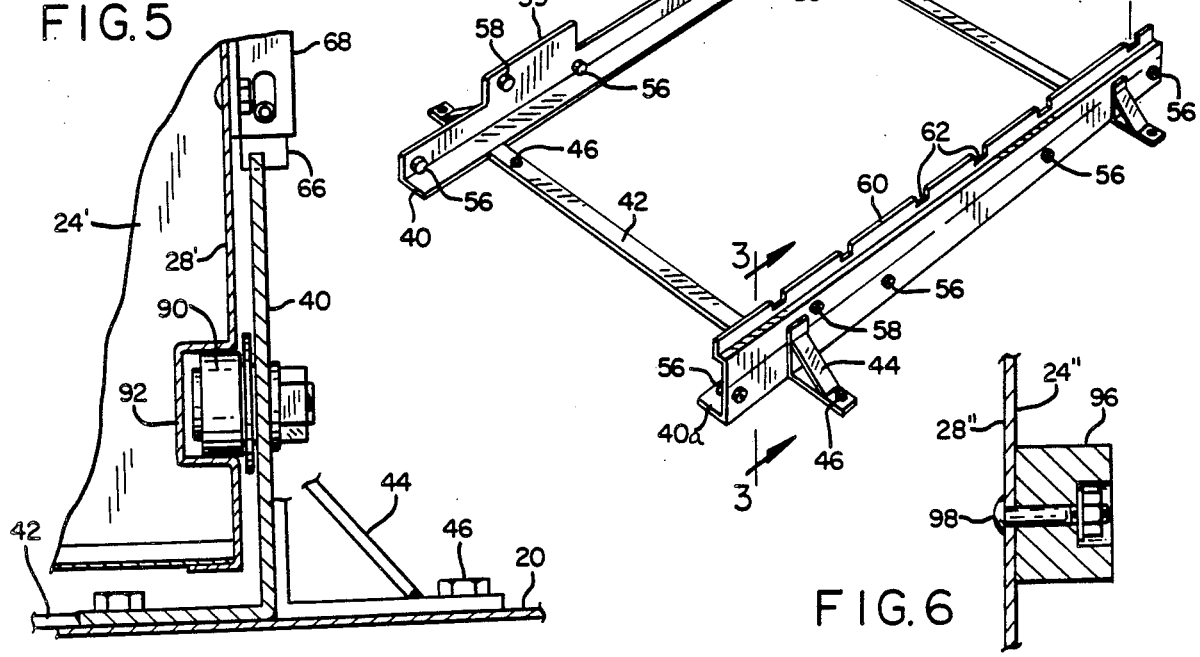
FIG. 5 is a fragmentary sectional view taken similar to FIG. 3 but showing a modified form of support means for the box.

With reference to FIG. 5, a modified form of box and support are provided. In this modification, longitudinal movable support for a box 24' comprises a plurality of rollers 90 mounted on the longitudinal support members and engageable in longitudinal recesses 92 formed in the sides 28' of the box. Such rollers are suitably located to provide movement of the box to its rearward access position which is horizontal and in alignment with its line of travel. With the rollers captive in the recesses 92, the box has the same cantilevered support in its rearwardmost position as in the embodiment of FIG. 2. Also, stop means, not shown, may be provided at the front of the recesses 92 in this embodiment to provide a stop at the rearward position.

Figure 6:
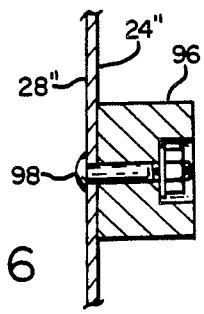
FIG. 6 is a fragmentary sectional view also taken similar to FIG. 3 but showing still another form of support means for the box.

FIG. 6 shows another embodiment of the invention wherein the side rails for engagement by rollers on the support members 40, similar to the arrangement of FIG. 1, comprise bar members 96 secured as by bolts 98 to the sides 28'' of the box 24''.

Figure 7:
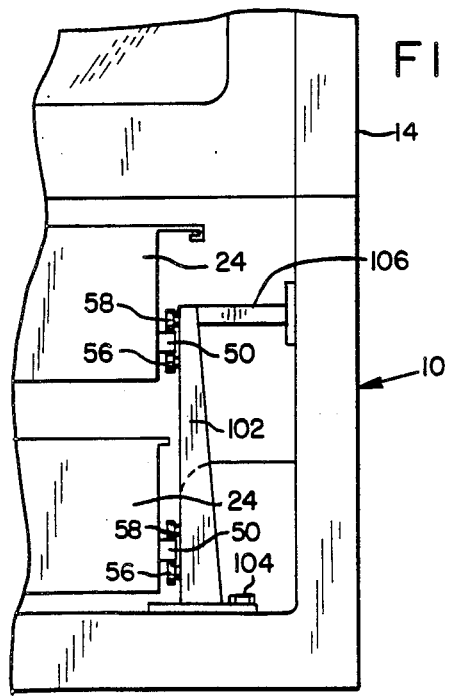
FIG. 7 is a fragmentary rear elevational view showing the concept of the invention as applied to a pair of access boxes mounted in a layered arrangement.

FIG. 7 illustrates the concept of the invention wherein two or more of the boxes 24 are arranged for support one above the other. These boxes have the same structure as that shown in FIGS. 2 and 3 as to their structure and rail support, comprising side rails 50 and roller support 56, 58. The rollers in this embodiment, however, are supported on upright stanchions 102 suitably secured integrally to the floor of the vehicle cargo area, as by bolts 104, and braced at the top by brace means 106. All the other features of the FIG. 2 embodiment may be present, including the latch means.

Figure 8:
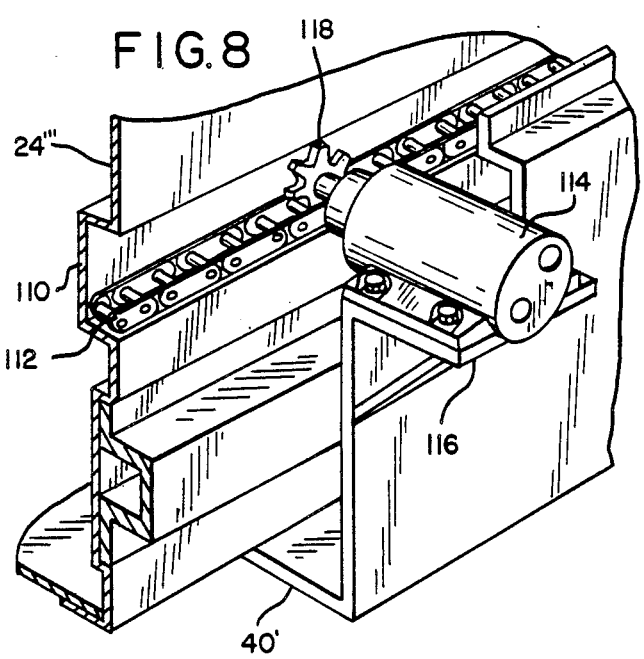
FIG. 8 is a fragmentary perspective view showing the application of power drive for moving the box between forward and rearward positions.

FIG. 8 illustrates an extension of the invention to power drive. The access box 24''' is similar to the stucture shown in FIG. 1 for its support on rollers but in addition includes an upper longitudinal recess 110 in a side wall of the box having a chain or gear segment 112 secured integrally to the bottom edge thereof. An electric motor 114 is mounted on an outturned shelf portion 116 formed in the longitudinal support member 40'. The output of the motor has a sprocket wheel 118 secured thereto engageable with the chain 112. The motor is located adjacent the rear of the longitudinal support member 40a' and is reversible whereby upon energization it is capable of driving the box in or out in its horizontal travel.

According to the invention, a combined access box and bed liner is provided which through its novel support means is arranged to be retracted rearwardly in a horizontal, self-supported position and due to its cantilevered support it will maintain itself in alignment with its line of travel. Thus, ground support is not required at the rearward end when the box is out. The box has an inner latched position and can be latched in any one of the several positions according to location of notches 62. The box cannot accidentally roll rearward unless the latch 84 is manually released, and if the box is to be brought rearward when the vehicle is on an upward incline, it can be safely moved from notch to notch since upon release of the latch 84, the detent 66 will automatically engage the notches. Thus, unless the latch rod 84 is held in released position the box cannot accidentally roll rearward or forward. Also, it will not become completely displaced from the vehicle since the stops 88 engage the roller 58 after the rearwardmost position of the box. With the box withdrawn to its rearwardmost position, articles in the front thereof can be reached through the rear opening 12 of the vehicle cargo area. Of course, intermediate positions of the box can also be used to conveniently reach articles between the ends. The rearward end of the box being open allows ready removal of articles through this end. Since cargo areas, such as the one illustrated, has rear closures, the rear end of the box is open whereby the closure on the vehicle will close this open end of the box.

As stated hereinbefore, the box is especially adaptable for use with pickup trucks having covers thereon such as the canopy 14. The box is readily withdrawn over the top of the open tailgate and articles can readily be reached from the side of the tailgate through the rear opening of the cargo area. For convenience, a front notch 62, such as the first one rearward of the first notch, locates the rear of the box flush with the rear edge of the open tailgate. The box by means of its ribbed floor and flanged side walls and front wall is structurally strong and durable. It also serves as a liner for the cargo area to protect such cargo area. It may be of narrowed width with relation to the width of the cargo area so that storage areas can be provided between the sides thereof and the sides of the vehicle.

It is to be understood that the forms of our invention herein shown and described are to be taken as preferred examples of the same and that various other changes in the shape, size and arrangement of parts may be resorted to without departing from the spirit of my invention, or the scope of the subjoined claims.

Having thus described our invention, we claim:

1. In combination,
a vehicle having a covered cargo area with forward and rearward ends and defined by a floor and side walls and a rear opening closed by a closure door,
an access box comprising an open top container having a bottom wall, side walls, and a front wall,
said container having an open rearward end,
triangular corner webs at said open rearward end secured between said side walls and said bottom wall for reinforcing said side walls at said open rearward end,
a pair of laterally spaced, longitudinal support members secured to the floor of said vehicle cargo area,
longitudinal rail means and engaging rollers on said container and support members respectively supporting said box above said floor for longitudinal movement between a forward loaded position a plurality of intermediate positions and a rearward access position,
said rail means and rollers providing self support of said box in said intermediate positions as well as in said rearward access position at a point such that articles in the front thereof can be reached from a point beyond the rear of said vehicle cargo area,
said longitudinal rail means and rollers providing cantilevered and straight line, self-support of said box in said rearward access position and in alignment with its line of travel,
one of said support members having a vertical extension along its length with a top edge and a plurality of latch recesses in said top edge,
a spring pressed, vertically operating latch on said container arranged for engagement with said latch recesses for automatic engagement therewith,
vertical guide means on said container providing stable vertical movement for said latch,
and rotatable manually operable control means operating said latch to allow the latch to automatically engage said stops or to cause said latch to bypass said stops,
a rearwardmost one of said latch recesses holding said container in its rearward access position and a forwardmost one of said latch recesses holding said container in a selected forward loaded position wherein said closure door of the vehicle forms a closure for said open rearward end of said container.

2. The combination of claim 1 wherein said side walls of said container have an outwardly turned flange extending longitudinally along the top thereof, said rotatable manually operable control means for operating said latch comprising a latch rod extending from said vertically operating latch to the rear of said container and being disposed immediately under said flange for protection.

3. In combination,
a vehicle having a covered cargo area with forward and rearward ends and defined by a floor and side walls and a rear opening closed by a closure door,
an access box comprising an open top container having a bottom wall, side walls, and a front wall,
an outwardly turned flange extending longitudinally along the top of the side walls of said container,
said container having an open rearward end,
a pair of laterally spaced, longitudinal support members secured to the floor of said vehicle cargo area,
longitudinal rail means and engaging rollers on said container and support members respectively supporting said box above said floor for longitudinal movement between a forward loaded position a plurality of intermediate positions and a rearward access position,
said rail means and rollers providing self support of said box in said intermediate positions as well as in said rear-access position at a point such that articles in the front thereof can be reached from a point beyond the rear of said vehicle cargo area,
said longitudinal rail means and rollers providing cantilevered and straight line, self-support of said box in said rearward access position and in alignment with its line of travel,
one of said support members having a top edge and a plurality of latch recesses in said top edge, a spring pressed, vertically operating latch on said container arranged for engagement with said latch recesses for automatic engagement therewith, vertical guide means on said container providing stable vertical movement for said latch, and a rotatable manually operable control rod operating said vertically operating latch to allow the latch to automatically engage said stops or to cause said latch to bypass said stops, said control rod extending from said vertically operating latch to the rear of said container and being disposed immediately under said flange for protection, a rearwardmost one of said latch recesses holding said container in its rearward access position and a forwardmost one of said latch recesses holding said container in a selected forward loaded position wherein said closure door of the vehicle forms a closure for said open rearward end of said container.

* * * * *